(12) United States Patent
Liang et al.

(10) Patent No.: US 6,468,344 B1
(45) Date of Patent: Oct. 22, 2002

(54) COMPOSITIONS AND METHODS FOR CURING CONCRETE

(75) Inventors: Roland Tak Yong Liang; Robert Keith Sun, both of Sydney (AU)

(73) Assignee: MBT Holding AG, Zurich (CH)

( * ) Notice: Subject to any disclaimer, the term of this patent is extended or adjusted under 35 U.S.C. 154(b) by 0 days.

(21) Appl. No.: 09/565,136

(22) Filed: May 5, 2000

(30) Foreign Application Priority Data

May 5, 1999 (AU) ............................................. PQ0189

(51) Int. Cl.⁷ .......................... C04B 16/00; C04B 16/04
(52) U.S. Cl. ....................................... 106/660; 106/802
(58) Field of Search ................................. 106/660, 802

(56) References Cited

U.S. PATENT DOCUMENTS

| | | | | | |
|---|---|---|---|---|---|
| 3,189,469 A | * | 6/1965 | Littler et al. | ................. | 106/660 |
| 3,935,021 A | * | 1/1976 | Greve et al. | ................. | 106/660 |
| 4,174,230 A | * | 11/1979 | Hashimoto et al. | ......... | 106/660 |
| 4,207,115 A | * | 6/1980 | Boehme et al. | ............. | 106/660 |
| 4,368,077 A | * | 1/1983 | Ceska et al. | ................ | 106/660 |
| 5,674,929 A | | 10/1997 | Melbye | ...................... | 524/377 |

* cited by examiner

*Primary Examiner*—Elizabeth D. Wood
(74) *Attorney, Agent, or Firm*—Fish & Richardson P.C.

(57) ABSTRACT

An internal curing composition for concrete includes a glycol and a wax. The glycol is preferably polyethylene glycol and the wax is preferably paraffin wax. When added to concrete, the composition facilitates the curing of concrete to a low porosity, high compressive strength product.

19 Claims, 4 Drawing Sheets

COMPOSITIONS AND METHODS FOR CURING CONCRETE

TECHNICAL FIELD

The present invention is concerned with self-curing concrete and in particular to internal curing compositions and methods of using said compositions for curing concrete.

BACKGROUND ART

Curing compositions are well known in the concrete art. They are materials which are applied to the surface of wet concrete to reduce or eliminate the loss of water from the concrete and therefore result in a better concrete which has lower permeability and therefore better strength and durability. These are typically emulsions of paraffins or microwaxes which are sprayed on to the surface. While these serve the purpose well, it is not always desirable to leave them on the surface to wear away by exposure to the elements, and removal can be costly and time-consuming.

It has been suggested that concrete can be cured by an "internal" curing admixture, that is, by the addition to and mixing into a concrete mix of an admixture which provides curing. While such compositions have been used in specialised applications such as shotcrete application, to date no such composition has been found to be able to meet the standards required in general concrete applications, for example, Australian Standard AS 3799.

The object of the present invention is to ameliorate at least some of the disadvantages of the prior art or to provide a useful alternative.

SUMMARY OF THE INVENTION

The present invention is based on the observation that a combination of a wax and a glycol, when added to concrete, enables internal curing of concrete which in many respects is equal to or superior to traditional forms of curing concrete, as assessed by a number of relevant parameters. The present invention provides for the first time an internal curing composition which, when added to concrete or other cementitious mixes, meets the required standards of curing (Australian Standard AS 3799).

According to a first aspect there is provided an internal curing composition including a glycol and a wax.

The preferred glycols are polyethylene glycol (PEG) and methoxypolyethylene glycol (MPEG). The PEGs have weight-average molecular weights (MWs) of from 200 to 10,000 and the MPEGs have MWs of from 350 to 5,000. The most preferred materials are PEGs with MWs of about 200.

The waxes for use in this invention are preferably selected from paraffin wax, microcrystalline wax and mixtures thereof, the preferred wax being paraffin wax.

A preferred internal curing composition according to the invention includes a paraffin wax and a PEG of MW about 200.

The preferred ratio of glycol to wax is from about 1:3 to about 1:12. More preferred is a ratio of about 1:4 to about 1:8. Even more preferred is a ratio of about 1:6.

According to a second aspect there is provided an internal curing concentrate including a composition according to the first aspect and water.

Preferably the concentrate includes from about 5% to about 15% polyethylene glycol, from about 52% to about 62% paraffin wax and from about 23% to about 43% water. Even more preferred is a concentrate which includes about 10% polyethylene glycol, about 57% paraffin wax and about 33% water. Also preferred is a concentrate with a high solids content, for example in excess of 50%.

Conveniently the concentrate is prepared in two parts, one including the paraffin wax and water, and the other polyethylene glycol. It would be understood however that polyethylene glycol and water may constitute one of the parts of the concentrate while the other part may be the paraffin wax. The two parts are combined to form the internal curing composition before addition to cement or a cementitious mix such as concrete. Optionally, the two parts of the concentrate may be added as separate components either simultaneously or sequentially in any order.

According to a third aspect there is provided a cementitious mix including a composition according to the first aspect or a concentrate according to the second aspect.

According to a fourth aspect there is provided a concrete mix including a composition according to the first aspect or a concentrate according to the second aspect.

Preferably the internal curing concentrate is present in an amount of about 2 $l/m^3$ to about 10 $l/m^3$ of cement or cementitious mix. Even more preferred is an amount of 5 $l/m^3$.

According to a fifth aspect there is provided a method of preparing internally curing cementitious mix or internally curing concrete mix including combining cement and aggregate with a composition according to the first aspect or a concentrate according to the second aspect, in the amount sufficient to enable a slurry or a paste prepared from said cementitious mix or said concrete mix to cure.

According to a sixth aspect there is provided a method of preparing internally curing concrete structure including combining cement and aggregate with a composition according to the first aspect or a concentrate according to the second aspect in the amount sufficient to enable said concrete structure to cure.

Preferably the glycol and the wax are added simultaneously. It will be understood that, in alternative embodiments of the present invention, the glycol and the wax can be added sequentially in any order. Further, in preferred embodiments the internal curing concentrate is to be added without dilution. Optionally, however, the internal curing concentrate may be diluted with water before use.

According to a seventh aspect there is provided a method of preparing internally curing concrete structure including combining a mix according to the third or the fourth aspect and water.

According to an eighth aspect there is provided a cementitious mix, a concrete mix or a concrete structure, when prepared by the method of any one of fifth, sixth or seventh aspects.

The term "cementitious mix" as used in the context of the present invention is intended to include mixes such as mortar, concrete and such like, and which may include other additives such as lime, plasticizers, defoamers, retarders, accelerators, water reducers, etc. However, the term "concrete" may be independently used in reference to a mix of cement and aggregate consisting of sand and/or gravel, which may also contain lime and plasticizers, defoamers, retarders, accelerators, water reducers, etc.

The term "aggregate" as used in the context of the present invention includes materials such as sand, gravel and the like.

DESCRIPTION OF THE PREFERRED EMBODIMENTS

Figure 1A:
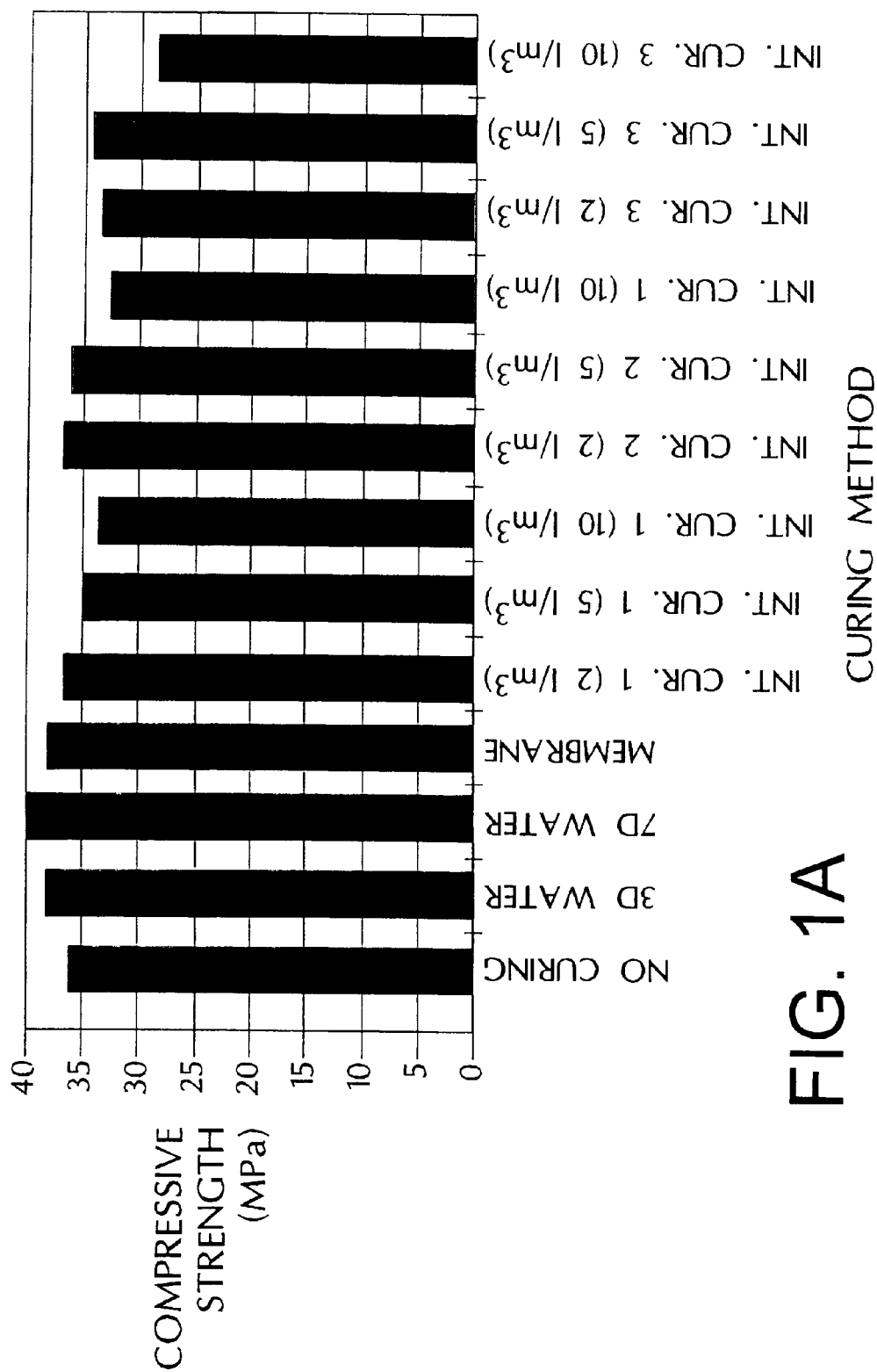
FIG. 1 Compressive strength (a) at 7 days of age of specimens cured under different methods; (b) at 28 days of age of specimens cured under different methods FIG. 2 Porosity of concrete cured under different methods FIG. 3 Rate of evaporation versus age, from 200×200=concrete slabs curing using internal curing compositions (dosage=5 l/m$^3$)

Self-curing is an "internal curing system" where a water-soluble polymer is added to the concrete mix. This method overcomes the difficulty in ensuring that effective curing procedures are employed by the construction personnel as the internal curing composition is a component of the mix. The mechanism of self-curing can be explained as follows:

Continuous evaporation of moisture takes place from an exposed surface due to the difference in chemical potentials (free energy) between the vapour and liquid phases. The polymers added in the mix mainly form hydrogen bonds with water molecules and reduce the chemical potential of the molecules which in turn reduces the vapour pressure. This reduces the rate of evaporation from the surface.

The effect of curing, particularly new techniques such as "self-curing", on the properties of high performance concrete is of primary importance to the modern concrete industry. As an initial step, there was investigated the effect of self-curing compositions, including that of the present invention, on moisture retention, strength development, porosity, permeability and shrinkage. Long-term strength development is also included in the test programme. The composition of the present invention, which is a combination of a wax and a glycol, is compared with one type of curing membrane, as an example of a traditional method of curing, and two internal curing compositions already known in the field, and results are compared with the traditional methods of water curing in a laboratory experimental programme. The test programme is detailed in Table 1.

For the purposes of this study, internal curing composition 2 consisted of paraffin wax (57%), polyethylene glycol (10%) and water (33%).

The paraffin wax used is an off-white solid and has a melting point of approximately 58° C. (CAS Registry No. 8002-74-2). The preferred polyethylene glycol has a molecular weight of approximately 200 and is an odourless liquid (CAS No. 25322-68-3).

It will be understood by those skilled in the art that cementitious mixes which employ large aggregates may use less internal curing composition due to surface area considerations and lower porosity, which results in smaller reaction areas, than mixes prepared with finer aggregates which have larger surface area and greater porosity resulting in increased propensity to lose moisture.

The membrane-forming curing compound ("Masterkure" (trade mark) 200R, ex MBT, Australia) used on the surface of the test specimens is a solvent-borne resin with an efficiency of 94% as determined in accordance with Australian Standard 3799 (1998).

TABLE 1

Test Programme for self-curing concrete Project

| Test Specimen | Test parameter | No curing | 3 day water | 7 day water | Membrane | Int Cur 1 | Int Cur 2 | Int Cur 3 |
|---|---|---|---|---|---|---|---|---|
| Concrete slabs 200 × 200 × 100 mm | Evaporation rate up to 28 days | + | + | + | + | + | + | + |
| Prisms 75 × 75 × 285 mm | Shrinkage Weight loss | + + | + + | + + | + + | + + | + + | + + |
| Cylinders 100 × 200 mm | 7-day comp. Strength | + | + | + | + | − | − | − |
| Concrete slabs 300 × 200 × 50 mm | Strength Evaporation | + + | + + | + + | + + | − + | − + | − + |

+ = test performed

EXPERIMENTAL

EXAMPLE 1

Internal curing compositions and curing membrane

The properties of the curing membrane and the internal curing compositions used are given in Table 2. Internal curing composition 3 is generically similar to that described in the technical literature. Internal curing composition 1 is a commercially-available product sold under the name of MEYCO (trade mark) TCC 735 (MBT, Australia) specifically for use with shotcrete. Internal curing composition 2 is the concrete curing composition of the present invention.

TABLE 2

Characteristics of Internal Curing Compositions and membrane-forming curing compound.

| Curing Material | Curing Membrane | Int. Curing Comp. 1 | Int Curing Comp. 2 | Int. Curing Comp. 3 |
|---|---|---|---|---|
| Base material | Solvent borne resin with dye | Water, wax emulsion and high MW polyethylene oxide | Water, paraffin wax & polyethylene glycol | Water-based polyethers |
| Solids content (%) | 48 | 25 | 64 | 71 |
| Specific Gravity | 0.89 | 0.978 | 0.934 | 1.110 |
| Curing Efficiency (%) | 94* | — | — | — |

TABLE 2-continued

Characteristics of Internal Curing Compositions and membrane-forming curing compound.

| Curing Material | Curing Membrane | Int. Curing Comp. 1 | Int Curing Comp. 2 | Int. Curing Comp. 3 |
|---|---|---|---|---|
| Appearance | Clear Red liquid | Milky Emulsion | Milky Emulsion | Dark liquid |
| Viscosity | Low | Low | Low | Low |
| Solubility in water | Not Soluble | Low Solubility | Low Solubility | Low Solubility |

*Tested according to AS 3799 - 1998

EXAMPLE 2

Binder Types

A type GP cement is used in the initial programme and the mixes do not have any other chemical admixtures such as superplasticizers. However, some slabs with a mix containing a superplasticizer are also investigated. The compatibility between the internal curing compositions and superplasticizers is an important consideration. The mix proportions, used in the initial investigation, with Type GP cement are shown in Table 3.

Subsequent investigations include fly ash and slag replacements. The mix with fly ash contains 25% of the cement replacement and the mix with slag contains 65% of cement replacement.

TABLE 3

Details of the mix with Type GP cement per $m^3$

| | Mix 1 | Mix 2 | Mix 3 | Mix 4 |
|---|---|---|---|---|
| Binder type | Type GP Cement | Type GP cement | Type GP cement | Type GP cement |
| Cement (kg) | 470 | 470 | 470 | 470 |
| Sydney sand (kg) | 565 | 565 | 565 | 565 |
| Nepean gravel –20 mm crushed (kg) | 940 | 940 | 940 | 940 |
| Water (kg) | 188 | 188 | 188 | 188 |
| Internal curing comp. 1 (litres) | | 2,5,10 | | |
| Internal curing comp. 2 (litres) | | | 2,5,10 | |
| Internal curing comp. 3 (litres) | | | | 2,5,10 |

EXAMPLE 3

Preparation of Specimens

Concrete slabs of 200×200×100 mm are cast in steel molds. Soon after the surface water disappears (2–3 hours after casting), the specimens are transferred to the controlled environment. The specimens are demolded after 1 day and kept in the controlled environment of 23±2° C. and 50±5% R.H. Cylinders and prisms are also cast and kept under the same environment until testing for compressive strength or shrinkage. To avoid any possible interaction between the mold releasing agent and the polymers used, the steel molds are lined with 'Rencourse' (trade mark), an aluminium core damp course lining which serves as a moisture barrier on five sides of the slabs exposing only the top surface. The following curing methods are used:
  (i) no curing
  (ii) 3 day water curing by ponding and these specimens are stored in a fog room at 23° C. The specimens are removed to the controlled environment after 3 days.
  (iii) 7 day water curing by ponding and these specimens are stored in a fog room at 23° C. The specimens are removed to the controlled environment after 7 days.
  (iv) curing by the application of a curing membrane (solvent-based resin curing compound with a dye) applied evenly at a rate of 0.2 litres/$m^2$ with a spraying equipment.
  (v) curing using the internal curing compositions at a dosage of typically 5 litres per $m^3$.

In addition to the slabs, it is necessary to cast a number of cylinders as companion specimens in order to measure certain properties as detailed below. All the companion specimens are subjected to exactly the same curing methods as their respective slabs.

EXAMPLE 4

Test Methods

Rate of evaporation

Moisture loss due to evaporation from the surface of the concrete slabs is measured periodically up to an age of 28 days using an electronic balance with a resolution of 0.1 g. The exposed surface of the slab is as cast and the other five surfaces are sealed with a waterproofing sheet which consists of an aluminium foil core ("Rencourse"). The top edges of the specimens are also sealed.

Compressive strength

Compressive strength is measured according to Australian Standard AS 1012.9 at ages of 3, 7 and 28 days using 100 mm diameter concrete cylinders, cured and stored in the same environment as the slabs. In addition, a number of cores cut from the slabs are also tested for comparison with the cylinders.

Porosity -RILEM Method

Porosity of concrete is determined using a vacuum saturation method (measured as described in RILEM RECOMMMENDATIONS CPC 11.3, Absorption of water by immersion under vacuum; "Materials and Structures": Research and Testing, Vol. 17, No. 101, Sep.–Oct. 1984, pp 391-394). The oven-dried specimens were evacuated dry for 1 hour and a further evacuation was carried out for 1 hour after introducing water in order to saturate the specimens. The porosity was then calculated from the oven-dry weight, saturated weight and submerged weight of the specimens.

Water absorption - RILEM Method

From the vacuum saturation method for porosity measurement hereinabove described, it is also possible to obtain values for the total water absorption. These values, based on an oven-dry basis of the specimens, are reported here.

Test Results and Discussion

The results obtained are presented and discussed below. These include compressive strength development with different dosages, porosity, water absorption and rate of evaporation. Comments are also made on the shrinkage of the specimens cured under different methods.

Compressive Strength Development

Figure 1B:
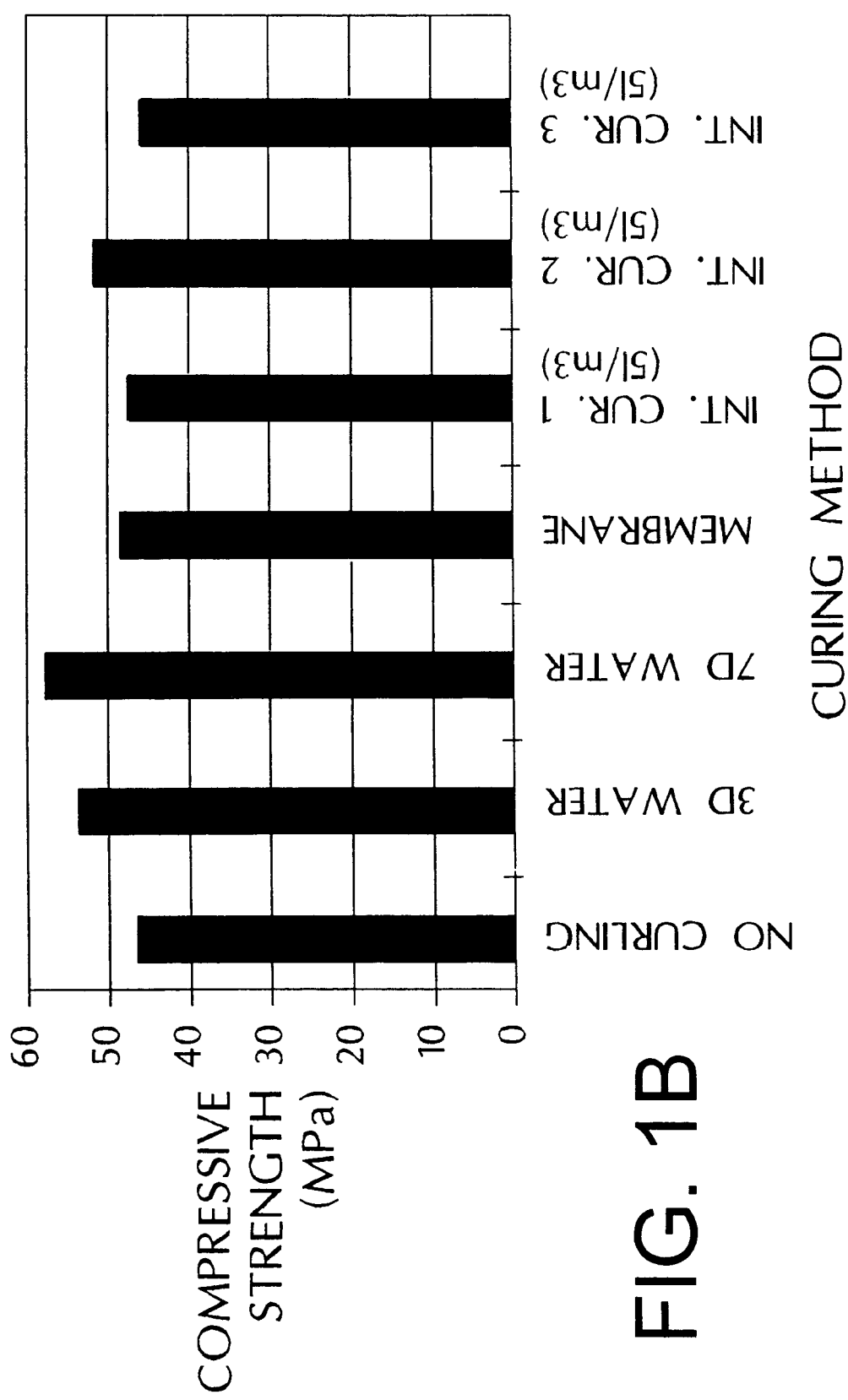

Compressive strength developments of concrete curing under different curing methods are compared in FIGS. 1(a) and 1(b). At 7 days of age, specimens water-cured for 7 days show the highest compressive strength of 40 MPa and specimens water-cured for 3 days show a strength of 38 Mpa. Membrane method of curing shows a comparable strength of 38 Mpa. Internal curing compositions 1 and 2 shows a strength above 35 MPa at dosages of 2 and 5 l/$m^3$. Internal curing composition 3 shows a strength slightly below 35 MPa at the above dosages. At a dosage of 10 l/$m^3$, internal curing compositions 1 and 2 show a slight reduction in strength. However, composition 3, at a dosage of 10 I/m³, shows a considerable reduction to give a strength of only 29 MPa. When compared with 3-day water-cured and membrane-cured specimens, this is a reduction of about 24%.

At 28 days of age, specimens with 7-day and 3-day water curing show strengths of 58 MPa and 55 MPa, respectively, and the membrane method of curing shows a strength of 49 MPa. At a dosage of 5 I/m³, internal curing composition 2 gives a comparable result (to the membrane method of curing) of 51 IMPa but internal curing composition 3 gives a lower result of 47 MPa. This is a reduction of 15% when compared with 32 day water curing.

At dosages of 2 and 5 I/m³ internal curing compositions 1 and 2 give compressive strengths comparable to those specimens cured using a high quality membrane. Internal curing composition 3 appears to give significantly lower compressive strengths.

Figure 2:
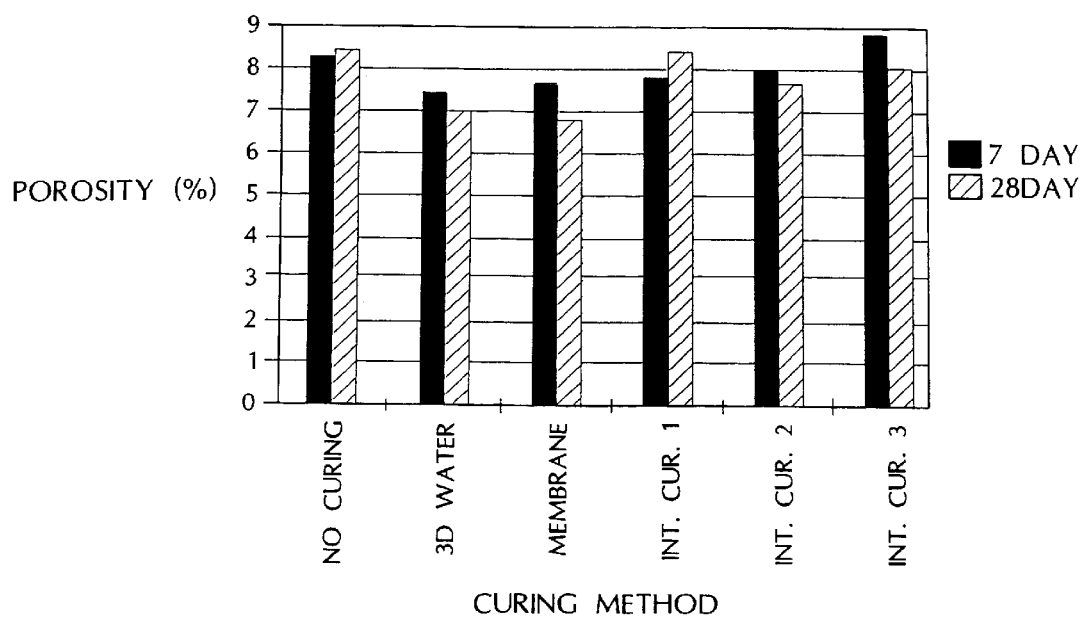

Porosities of concrete, as determined by a vacuum saturation method, at 7 and 28 days of age are compared in FIG. 2. Internal curing composition 2 gives porosity values similar to the membrane-cured specimens but internal curing composition 3 shows no reduction in porosities when compared with a non-cured specimen, particularly at an early age of 7 days.

Figure 3:
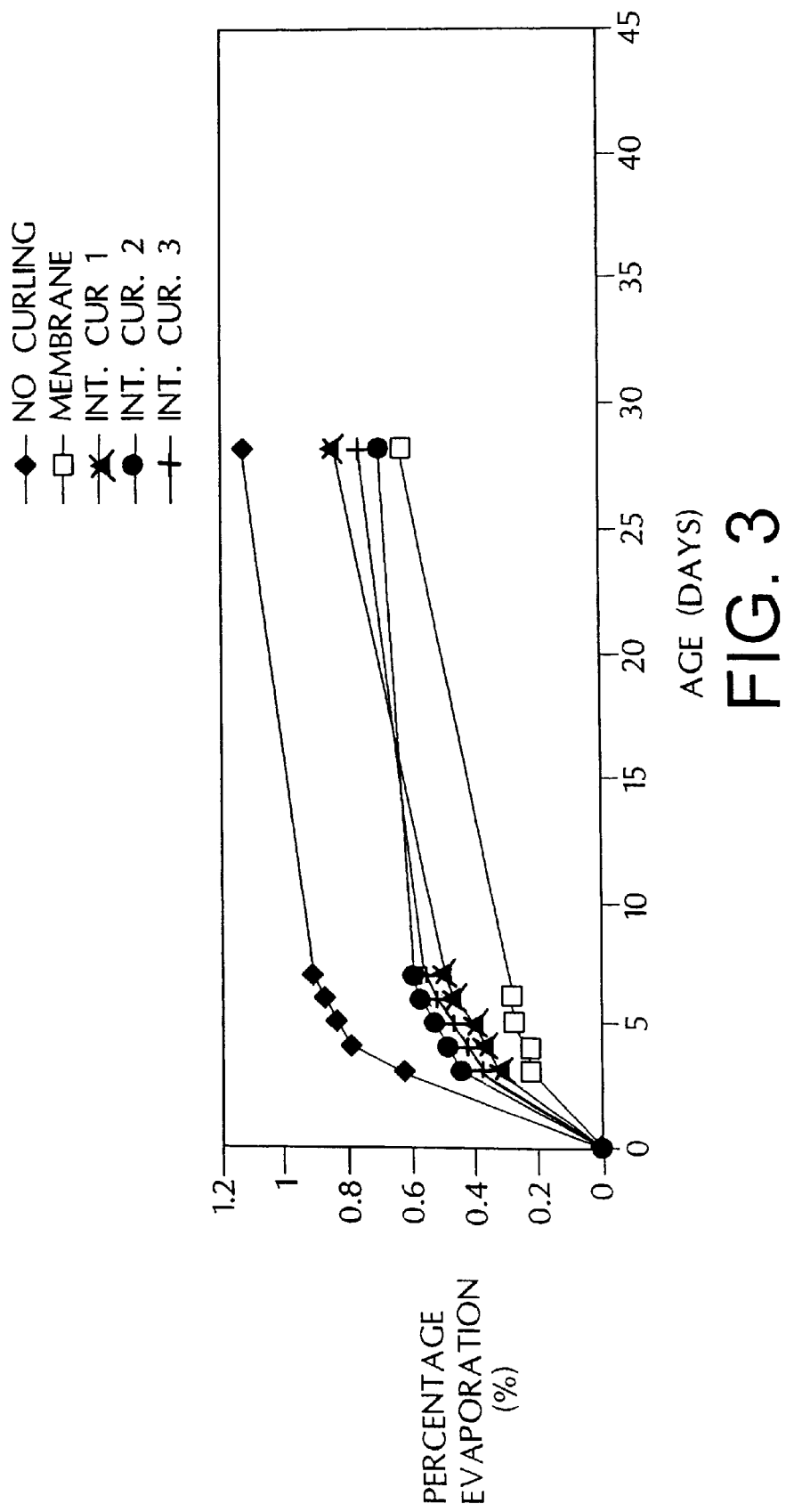

The rate of evaporation at 23° C. and 50% R.H. of 50 mm thick concrete slabs are compared in FIG. 3.

The performance of internal curing composition 2 is similar to that of the membrane after 28 days and is better than 3-day water curing. A specimen cured in water for 3 days and then exposed to the same environment loses more moisture after 28 days when compared with both membrane method and internal curing composition 2 method. In both these cases, the rates of evaporation of moisture from the slabs are considerably lower than those of a non-cured slab.

The water absorption, determined from the saturated, submerged and oven-dry weights of specimens cured under different conditions, are shown in Table 4. Water absorption clearly distinguishes the different curing methods. Water curing for 3 days, membrane method and internal curing composition 2 clearly show a substantial reduction in the absorption values when compared with the other methods.

TABLE 4

Water Absorption under different curing conditions (based on oven-dried basis)

| Curing Condition | 7 Day Absorption (%) | 28 Day Absorption (%) |
|---|---|---|
| No Curing | 5.10 | 5.04 |
| 3 Day Water Curing | 3.24 | 3.15 |
| Curing Membrane | 3.88 | 3.28 |
| Internal Curing Composition 1 | 4.90 | 4.78 |
| Internal Curing Composition 2 | 3.99 | 3.31 |
| Internal Curing Composition 3 | 4.71 | 4.45 |

Some of the conclusions which can be drawn from the results available to date are as follows:

1. Internal curing composition 2 of the present invention exhibits moisture retention characteristics similar to those of the solvent-borne resin membrane and performs better than 3-day water curing.
2. At dosages from 2 to 5 I/m³ the strength development of the three internal curing compositions are compared. Internal curing compositions 1 and 2 give compressive strengths similar to those of a high quality solvent-borne resin membrane. However, internal curing composition 3 appears to show a significantly lower strength, particularly at the highest dosages.
3. Porosity and absorption values obtained with internal curing composition 2 are comparable to those obtained with the solvent-borne resin membrane. These values are also comparable to those obtained from 3-day water curing.

Internal curing compositions of the present invention provide significant advantages over the known compositions and provide for the first time a reliable means of ensuring that proper curing is carried out. They allow the elimination of the need for external curing procedures.

Although the present invention has been described with reference to preferred embodiments, it will be understood that variations which are in keeping with the spirit and intent of the invention are also contemplated and fall within its scope.

What is claimed is:

1. A cementitious mix comprising cement and an aggregate, further including an internal curing composition which includes a glycol and a wax.

2. The cementitious mix according to claim 1 wherein the glycol is selected from the group consisting of polyethylene glycols of weight-average molecular weight from 200 to 10,000 and methoxypolyethylene glycols of weight-average molecular weight from 350 to 10,000.

3. The cementitious mix according to claim 2 wherein the glycol is a polyethylene glycol of weight-average molecular weight of about 200.

4. The cementitious mix according to claim 1 wherein the wax is selected from the group consisting of paraffin wax, microcrystalline wax and mixtures thereof.

5. A cementitious mix according to claim 1 wherein the ratio of glycol to wax is from about 1:3 to about 1:12.

6. A cementitious mix according to claim 5, wherein the ratio of glycol to wax is from about 1:4 to about 1:8.

7. A cementitious mix according to claim 6, wherein the ratio of glycol to wax is about 1:6.

8. A cementitious mix comprising cement and an aggregate, further including an internal curing concentrate which includes a glycol, a wax and water.

9. A cementitious mix including an internal curing concentrate according to claim 8 wherein the glycol is selected from the group consisting of polyethylene glycols of weight-average molecular weight from 200 to 10,000 and methoxypolyethylene glycols of weight-average molecular weight from 350 to 10,000.

10. A cementitious mix including an internal curing concentrate according to claim 8 wherein the wax is selected from the group consisting of paraffin wax, microcrystalline wax and mixtures thereof.

11. A cementitious mix including an internal curing concentrate according to claim 8 wherein the solids content of the internal curing concentrate is at least 50%.

12. A cementitious mix including an internal curing concentrate according to claim 8 wherein the internal curing concentrate comprises from about 5% to about 15% polyethylene glycol, from about 52% to about 62% paraffin wax, and from about 23% to about 43% water.

13. A cementitious mix including an internal curing concentrate according to claim 12 wherein the internal curing concentrate comprises about 10% polyethylene glycol, about 57% paraffin wax, and about 33% water.

14. A cementitious mix according to claim 8 wherein the internal curing composition is present in the cementitious mix in an amount of from about 2 I/m3 to about 10 I/m3.

15. A cementitious mix according to claim 14 wherein the internal curing composition is present in the cementitious mix in an amount of about 5 I/m3.

16. A cementitious mix including an internal curing composition according to claim 1 which further comprises water in a sufficient amount to prepare a slurry or a paste suitable for forming structures.

17. A cementitious mix including an internal curing concentrate according to claim 8 which her comprises water in a sufficient amount to prepare a slurry or a paste suitable for forming structures.

18. A method of preparing an internally curing cementitious structure formed from a cementitious mix according to claim 1 by combining cement and the internal curing composition, optionally also adding water, in order to form a paste or slurry therefrom and thereafter allowing said paste or slurry to cure.

19. A method of preparing an internally curing cementitious structure formed from a cementitious mix according to claim 8 by combining cement and the internal curing concentrate, optionally also adding water, in order to form a paste or slurry therefrom and thereafter allowing said paste or slurry to cure.

* * * * *